United States Patent
Lin et al.

(10) Patent No.: US 6,192,456 B1
(45) Date of Patent: Feb. 20, 2001

(54) METHOD AND APPARATUS FOR CREATING FORMATTED FAT PARTITIONS WITH A HARD DRIVE HAVING A BIOS-LESS CONTROLLER

(75) Inventors: Yen-Chung Lin, Saratoga; Thanh Tu Bui, San Jose, both of CA (US)

(73) Assignee: Adaptec, Inc., Milpitas, CA (US)

( * ) Notice: Under 35 U.S.C. 154(b), the term of this patent shall be extended for 0 days.

(21) Appl. No.: 09/281,715

(22) Filed: Mar. 30, 1999

(51) Int. Cl.[7] .............................. G06F 12/00; G06F 9/445
(52) U.S. Cl. ................................ 711/173; 707/205; 713/2
(58) Field of Search .......................... 711/173; 707/205; 713/2

(56) References Cited

U.S. PATENT DOCUMENTS

| | | | |
|---|---|---|---|
| 5,270,877 | * 12/1993 | Fukushima et al. . | |
| 5,418,918 | 5/1995 | Vander Kamp et al. | 395/375 |
| 5,430,845 | 7/1995 | Rimmer et al. | 395/275 |
| 5,630,093 | * 5/1997 | Holzhammer et al. . | |
| 5,680,556 | 10/1997 | Begun et al. | 395/311 |
| 5,694,600 | 12/1997 | Khenson et al. | 395/652 |
| 5,905,888 | 5/1999 | Jones et al. | 395/652 |
| 5,951,685 | 9/1999 | Stancil | 713/2 |
| 6,000,023 | * 12/1999 | Jeon . | |

* cited by examiner

*Primary Examiner*—Jack A. Lane
(74) *Attorney, Agent, or Firm*—Martine Penilla & Kim, LLP

(57) ABSTRACT

A method includes operations for creating and formatting FAT partitions beyond the first gigabyte of a disk having more than one gigabyte of data storage space, when the disk is associated with a controller card that does not include an option-ROM with a BIOS. In particular, the method populates at least one variable of each partition boot sector with a non-F6 value which then is detected to cause the use of the partition LBA for formatting the boot sector, rather than the partition CHS. A computer readable medium can also include program instructions for creating and formatting FAT partitions beyond the first gigabyte of a disk having more than one gigabyte of data storage space, when the disk is associated with a controller card that does not include an option-ROM with a BIOS.

18 Claims, 12 Drawing Sheets

|  | FAT-32 | FAT-16 |
|---|---|---|
| BYTES / SECTOR | X | X |
| RESERVED SECTORS | X | X |
| NUMBER OF FATS | X | X |
| MEDIA TYPE | X | X |
| SECTORS / TRACK | X | X |
| NUMBER OF HEADS | X | X |
| HIDDEN SECTORS | X | X |
| LARGE SECTORS | X | X |
| PHYSICAL DISK NUMBER | X | X |
| EXT. BPB SIG. | X |  |
| VOLUME LABEL | X | X |
| FAT TYPE | X |  |
| END MARKER | X | X |

METHOD AND APPARATUS FOR CREATING FORMATTED FAT PARTITIONS WITH A HARD DRIVE HAVING A BIOS-LESS CONTROLLER

BACKGROUND OF THE INVENTION

1. Field of the Invention

This invention relates generally to computer systems and associated hardware, and particularly to methods and apparatuses for creating formatted FAT partitions on a computer readable medium of a hard drive having a BIOS-less controller.

2. Description of the Related Art

A computer system 10, such as shown in FIG. 1, can store and retrieve data from computer readable media in various forms such as magnetic disks, magnetic tapes, and the like. To do so, the computer system 10 can include or be connected to a media drive which physically interacts with the medium 12 and translates data between the computer system and the medium. Such a media drive can be a hard drive, a tape drive, a floppy disk drive, a CD drive, etc. The media drive can be internal to the computer system or can be an external peripheral device 14 that is connected to the computer system as shown in FIG. 1.

To facilitate communication between the computer system 10 and the peripheral device 14, the computer system 10 includes a controller card 16 which is connected to a central processing unit (CPU) 18 of the computer system 10 through a bus 20. To utilize the computer system 10, an operating system (OS), such as Windows 95™ or DOS™, is run by the CPU 18. The controller card 16 enables communication between the peripheral device 14 and the OS via a communication protocol such as EIDE on SCSI. As shown in FIG. 2A, the controller card 16 includes a controller 22 connected to an option read-only-memory (ROM) 24. The controller 22 enables communication between the peripheral device 14 and the OS via a communication protocol such as EIDE on SCSI. As is well known, the option ROM 24 contains code in the form of a BIOS that enables the OS to identify the type of controller 16 connected to the computer system 10 and the type of peripheral devices 14 connected to the controller card 16. Thus, when a controller card 16 has an option ROM 24, it can be recognized during bootup and therefore can function as a boot device. Alternatively, a controller card such as controller card 16' of FIG. 2B can include a controller 22 without an option ROM 24.

FIG. 3 is a schematic of data storage space 26 of a computer readable medium, such as a disk of a hard disk drive. Also noted is the type of data that can be resident on a partitioned and formatted disk. A master boot record (MBR) can begin at the beginning of the data storage space 27. Included in the master boot record MBR is data which identifies the beginning location, also sometimes referred to as the location of other partitions on the disk. For example, the respective locations 28 and 29 of a primary partition D:, and a first extended partition P1 can be included. The primary partition D: is a file allocation table (FAT) partition which includes a boot sector 30 made up of multiple variables which describe the data structure of the primary partition D:. The primary partition D: also includes reserved data storage space 31 which is made available for future data.

The first extended partition P1 includes a first partition boot record PBR-1 which contains respective locations 32 and 33 of a first logical drive E:. Also shown is a second extended partition P2. The first logical drive E: also is a FAT partition and includes a boot sector 34 which performs the same function for the first logical drive E: as the boot sector 30 does for the primary partition D:. Also as does the primary partition D:, the first logical drive E: includes reserved data storage space 35 which is made available for future data. The second extended partition P2 includes a second partition boot record PBR-2 that can contain further locations of other logical drives or other extended partitions. Of course, the remainder of the data storage space 26 can also include other extended partitions with other partition boot records and other logical drives with other boot sectors and other reserved data storage space. Also, between the master boot record MBR and the disk partitions, as well as between each partition, is included unused data storage space 36.

To facilitate data location on the disk, the above locations are described in two different coordinate systems. In a first coordinate system, a cylinder-head-sector (CHS) location is given as three coordinates which describe the location of a sector relative to other sectors in the same head, sometimes referred to as a track of the disk. Further, this describes the location of a head relative to other heads on the disk, and the location of the cylinder relative to other cylinders on the disk. In contrast, the second coordinate system provides a logical block address (LBA) for a sector, which is an absolute location on the disk. For example, the master boot record MBR has a cylinder-head-sector (CHS) location of 0,0,1 which corresponds to an LBA location of 0. In general, these systems are used to create and format partitions on the disk as described in more detail below.

FIG. 4 is a process diagram for a method 40 of creating formatted partitions on a computer readable medium such as a disk, according to the prior art. In operation 42 the sizes of the partitions are input while in operation 44 the types of these partitions are input. For example, the sizes of the partitions and the types of partitions can be input by a user of the computer system 10. In operation 46 the partitions are created on the disk. In operation 48 the computer system is rebooted, and the disk is formatted in operation 50. With operating systems such as Windows 95™ and DOS™, operations 42, 44, and 46 can be performed using program instructions referred to as FDISK operations, while operation 50 can be performed using program instructions referred to as FORMAT.

FIG. 5 is a process diagram further detailing the operations of operation 46 of FIG. 4. In operation 52 the master boot record (MBR) is populated with data including the CHS location and LBA of the various boot sectors of the partitions. In operation 54, each of the boot sectors of each of the partitions are populated with the value "F6" for substantially all of the variables. FIG. 6 depicts a process diagram further outlining the operations of operation 50 in FIG. 4. The user selects the partitions to be formatted in operation 56. Once the partitions to be formatted have been selected, the process advances to write full boot sector data at CHS or LBA locations. Typically, this formatting operation is performed using a Microsoft Windows formatting tool.

Unfortunately, when the above method is practiced with an operating system such as Windows 95™ or DOS™, the use of the CHS location to write the boot sector data can result in the misplacement of some boot sectors on the disk. In particular, a boot sector, that is desired to be located beyond the first gigabyte of a disk having a data storage space of greater than one gigabyte, may be incorrectly placed within the first gigabyte of the data storage space. This is exemplified in FIG. 7 schematically depicting a data storage space 70 of two gigabytes (2 GB). Here, the first and second sectors BOOT 1 and BOOT 2 are desired to be, and have been, placed within the first gigabyte of the data storage space 70. A third boot sector BOOT 3 is desire to be located in the third boot sector location 72 which is beyond the first gigabyte of the data storage space 70.

However, this can be performed improperly in the case of an operating system which uses the operations of FIGS. 4 through 6, such that the full boot sector data is written at the CHS. Specifically, the third boot sector BOOT 3 is undesirably placed at a location 74 within the first gigabyte of the data storage pace 70. In the case shown in FIG. 7, the third boot sector BOOT 3 is therefore within the portion of the data storage space allocated to the partition associated with the first boot sector BOOT 1. Therefore, data that is desired to be written to and retrieved from the partition associated with the first boot sector BOOT 1 can be overwritten and or corrupted by data that is written to the third boot sector BOOT 3. Also, the reverse can be true, with data desired to be written to or retrieved from the third boot sector BOOT 3 being possibly corrupted or inaccessible.

Thus, it is desired to provide a method and apparatus for creating a desired formatted partition beyond the first gigabyte of a disk that is associated with a controller card that does not have a BIOS on an option-ROM, and in conjunction with certain operating systems (e.g., Windows 95™, DOS™, etc.). In particular it is desired that the partition actually be located beyond the first gigabyte without corrupting data of other partitions or making the data of the desired partition unavailable.

SUMMARY OF THE INVENTION

Broadly speaking, the present invention fills these needs by providing a method and apparatus for creating and formatting FAT partitions beyond the first gigabyte of a disk having more than one gigabyte of data storage space, when the disk is coupled to a controller card that does not include an option-ROM with a BIOS. In particular, a method and apparatus populate at least one variable of each partition boot sector with a non-F6 value which then is detected to cause the use of the partition LBA for formatting the boot sector, rather than the partition CHS. It should be appreciated that the present invention can be implemented in numerous ways, including as a process, an apparatus, a system, a device, a method, or a computer readable medium. Several inventive embodiments of the present invention are described below.

In an embodiment of the present invention, a method for creating FAT partitions on a computer readable medium includes running an operating system on a computer system that is connected to a computer readable medium, having greater than one gigabyte of data storage space. The computer readable medium is also associated with a controller card without a BIOS on an option ROM. In particular, the operating system is configured to create a FAT partition within a first gigabyte of data storage space in a location that is included within at least one other partition. In addition, the method includes partitioning the computer readable medium with the FAT partition within a portion of the computer readable medium that is beyond the first gigabyte of data storage space. Further, the method includes formatting the computer readable medium, including the FAT partition within the portion of the computer readable medium that is beyond the first gigabyte of data storage space.

In another embodiment of the present invention, a method of creating FAT partitions on a computer readable medium that is connected to a computer system, includes booting an operating system associated with a computer system, inputting a desired quantity of FAT partitions, and inputting a desired type to be associated with each of the FAT partitions. The method also includes determining a size of each of the FAT partitions, wherein the size is equal for each of the FAT partitions, and providing a user with opportunity to enter a modification of the size of at least one of the FAT partitions. Further, the method includes creating the FAT partitions on a computer readable medium using the modification if entered, rebooting the operating system, and formatting the computer readable medium.

In yet another embodiment of the present invention, a computer readable medium, containing program instructions for creating formatted FAT partitions on a separate computer readable medium, having greater than one gigabyte of data storage space and being associated with a controller card without a BIOS on an option ROM, in conjunction with an operating system that is configured to create a FAT partition within a first gigabyte of the data storage space in a location that is included within at least one other partition, includes program instructions for partitioning the separate computer readable medium. In particular, the FAT partition is within a portion of the computer readable medium that is beyond the first gigabyte of data storage space. The computer readable medium also includes program instructions for formatting the separate computer readable medium, including the FAT partition within the portion of the computer readable medium that is beyond the first gigabyte of data storage space.

Although the embodiments of the present invention have multiple additional advantages, the ability of the present invention to create and format a partition in an appropriate location beyond a first gigabyte of data storage space improves data accuracy and accessibility. These and other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings wherein like reference numerals designate like elements.

FIG. 12 is a table of exemplary variables comprising a boot sector of a partition formed according to an embodiment of the present invention;

FIG. 13 is a table of values in a boot sector of a FAT-32 partition after formatting according to an embodiment of the present invention.

DETAILED DESCRIPTION OF THE PREFERRED EMBODIMENTS

An invention is described for creating and formatting FAT partitions beyond the first gigabyte of a disk having more than one gigabyte of data storage space, when the disk is associated with a controller card that does not include an option-ROM with a BIOS. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 8:
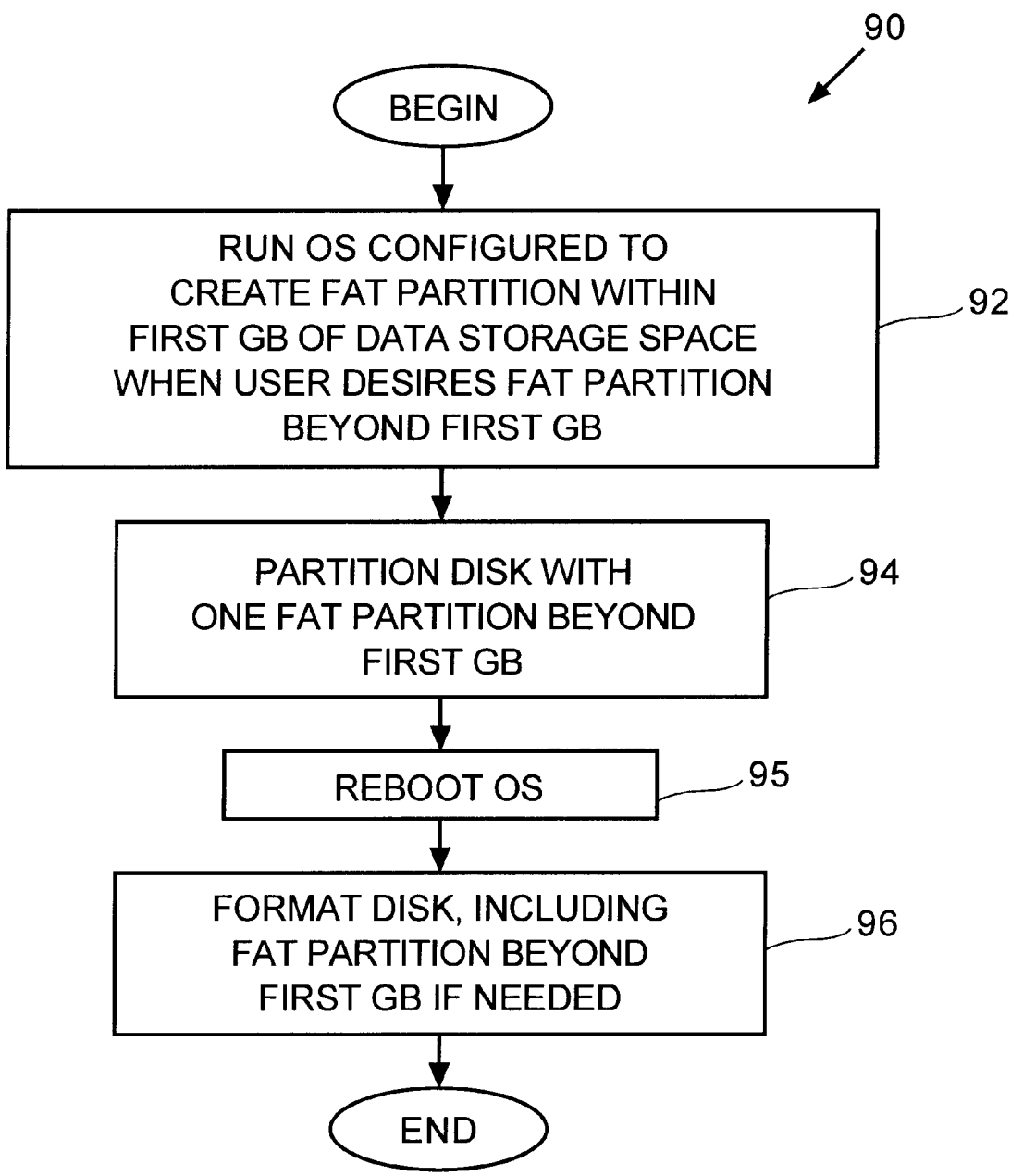
FIG. 8 is a process diagram of a method for creating and formatting a disk, according to an embodiment of the present invention.

FIG. 8 is a process diagram for a method 90 for creating formatted partitions on a computer readable medium, or disk, in accordance with an embodiment of the present invention. Method 90 includes running an operating system (OS) in operation 92 that is configured to create FAT partitions within a first gigabyte (GB) of data storage space on the computer readable medium when a user desires a FAT partition beyond the first gigabyte in operation 92 and the disk is not associated with an option-ROM with a BIOS on a controller card. While the operating system is run, operation 94 includes partitioning the disk with a FAT partition beyond the first gigabyte. After rebooting the operating system in operation 95, method 90 also includes formatting the disk, including a FAT partition beyond the first gigabyte, in operation 96. As an example, an operating system such as Microsoft Windows 95™ or DOS™ can be run in operation 92.

Figure 9:
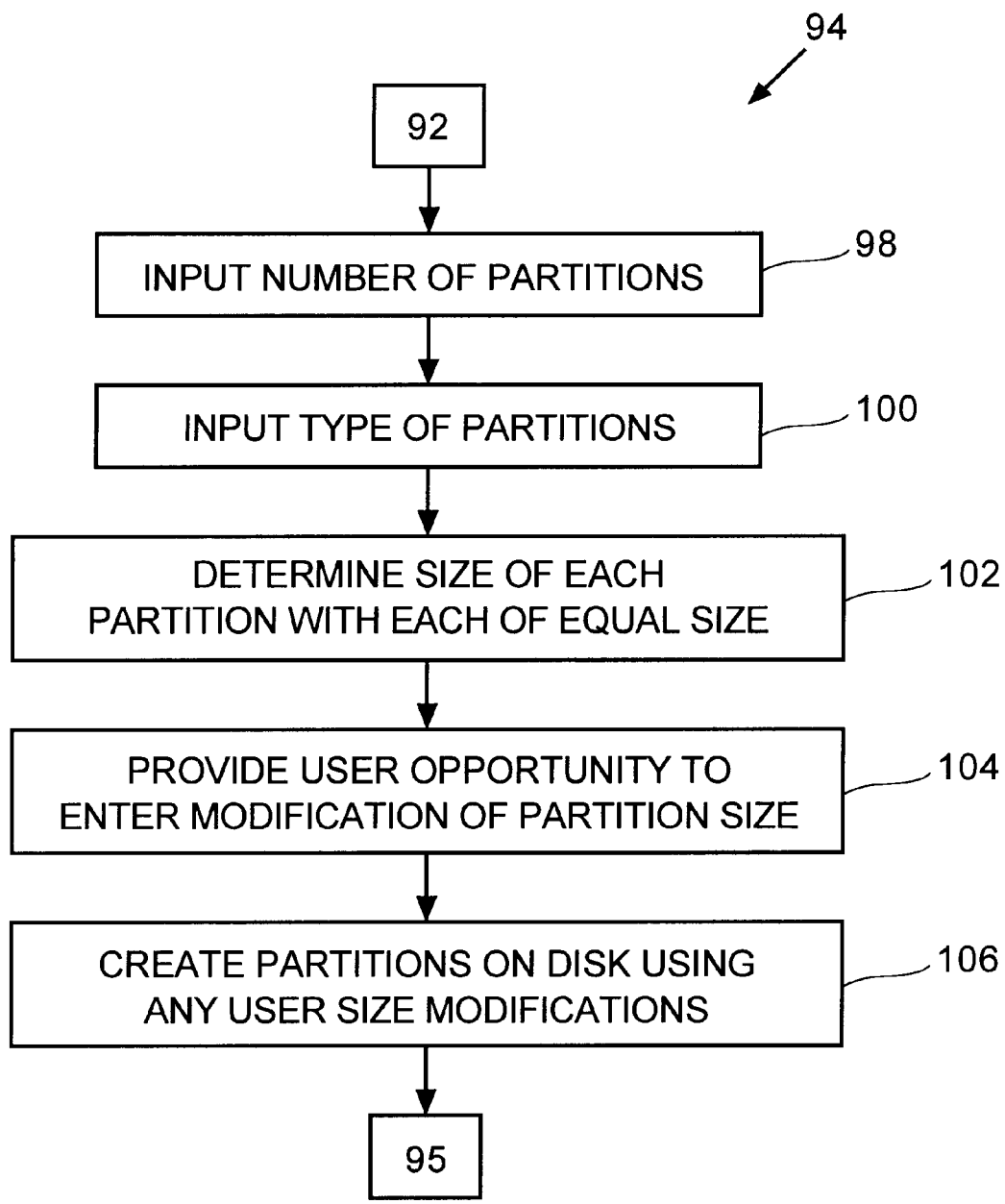
FIG. 9 is a process diagram of the disk partitioning operation of the method of FIG. 8, according to an embodiment of the present invention.

FIG. 9 depicts a process diagram further detailing operation 94 of FIG. 8. In operation 98 the desired number of partitions is input, for example by the user. In a particular embodiment, the inputting of this number can be in response to a query presented to the user. Also in operation 100, the type of partition for each of the desired partitions is input. As with operation 98, in a particular embodiment the imputing of the types of partitions in operation 100 can be in response to a query presented to a user.

In operation 102 the size of each partition is determined, with each partition assumed to be of equal size. For example, the size can be approximately determined by dividing the total amount of data storage space by the number of partitions input in operation 98. In operation 104, the user is provided an opportunity to enter a modification of partition sizes. For example the user can modify the size of one or more partitions. In a particular embodiment, a computer graphical depiction of each of the desired partitions and their relative size is presented to the user. Further, the user is provided with the opportunity to modify the computer graphical depiction of the partition sizes through the user input device such as a mouse, a pointer, a roller ball, a track ball, a pen on glass pointer, or the like. In operation 106, the desired partitions are created on the disk using any user size modification entered in operation 104.

Figure 10:
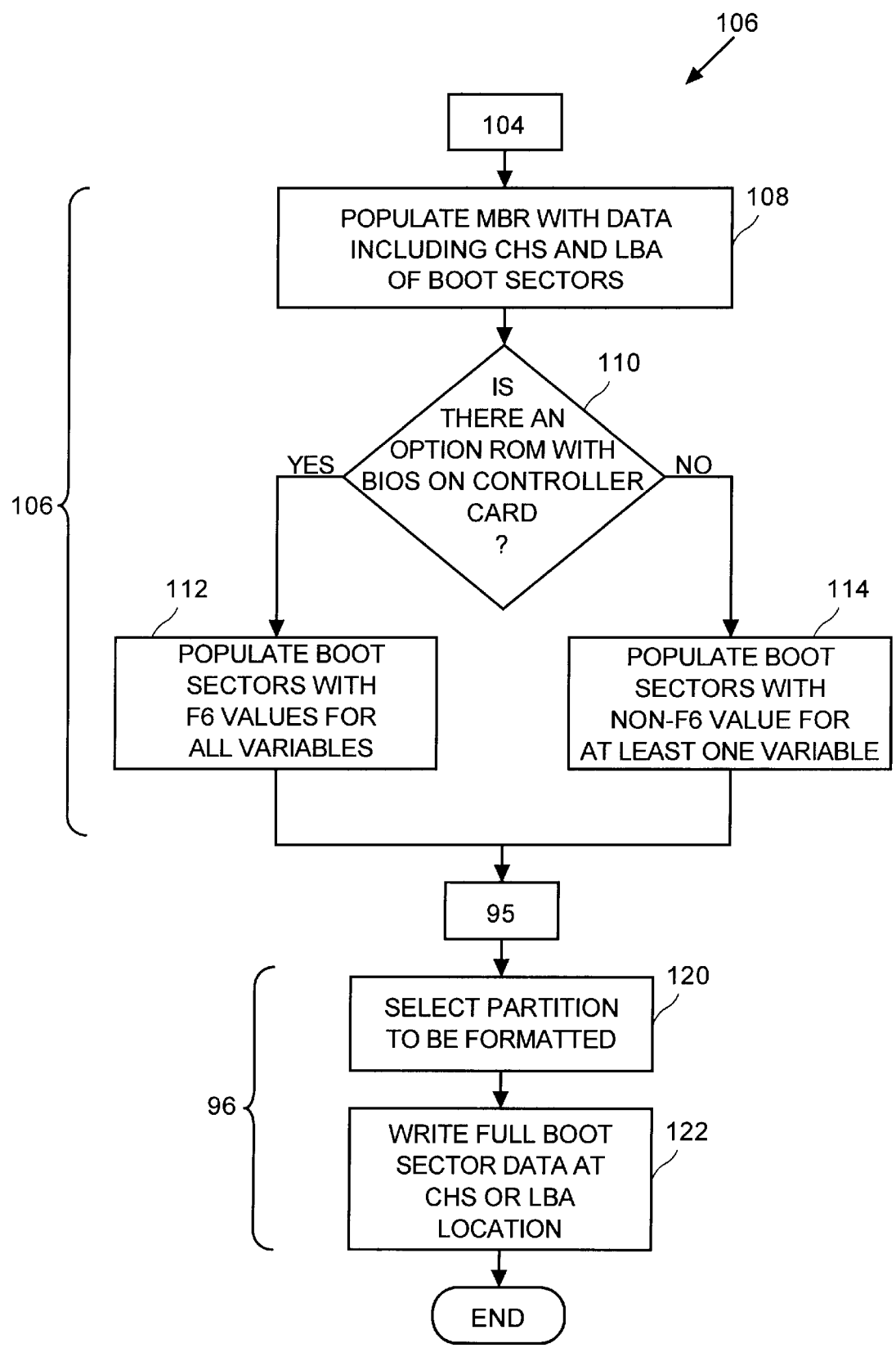
FIG. 10 is a process diagram of the partition creation operation of the operation of FIG. 9, according to an embodiment of the present invention.
Figure 13:
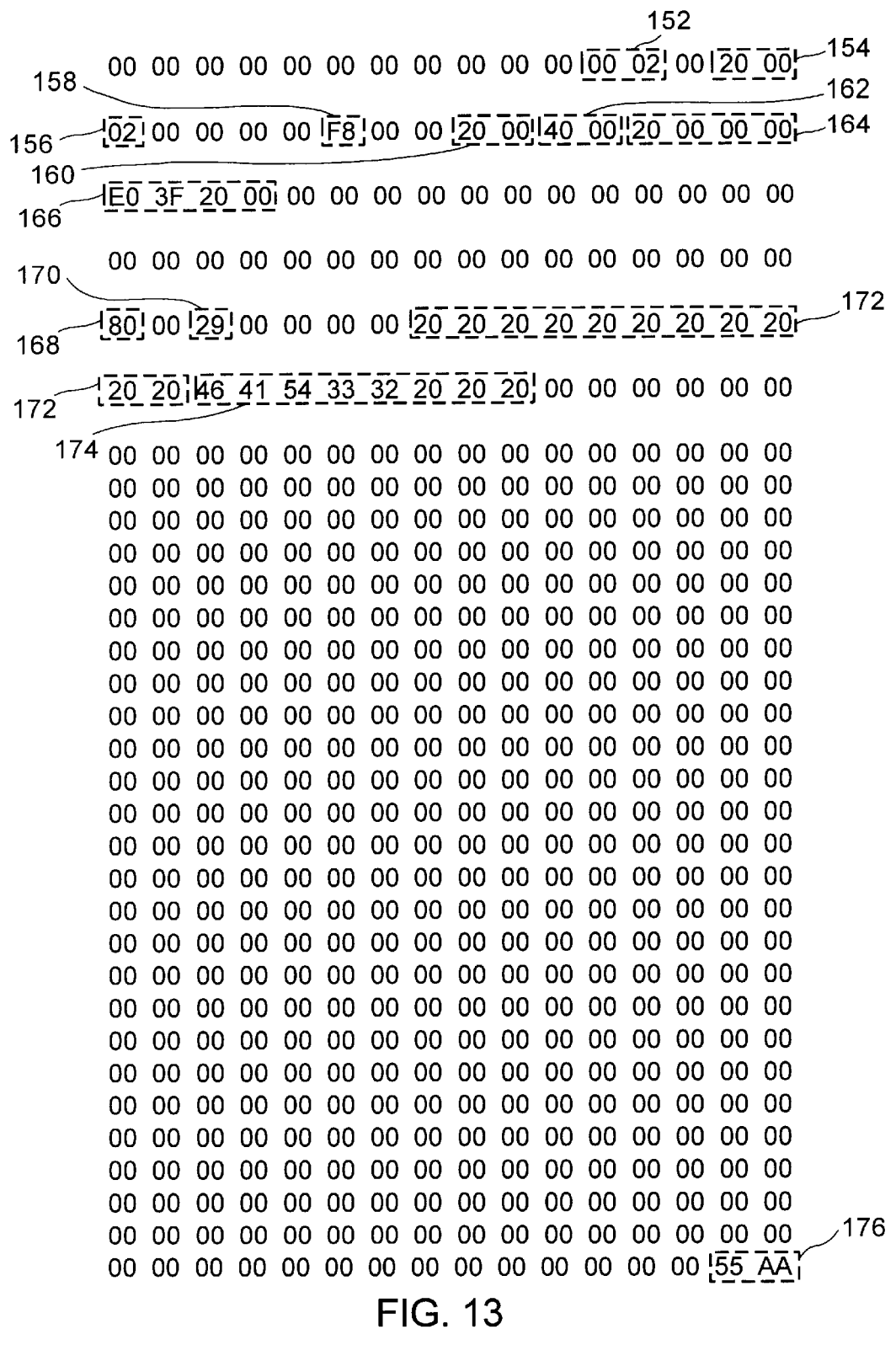

FIG. 10 is a process diagram depicting further operations of operation 106 of FIG. 9. In operation 108, the master boot record (MBR) is populated with data including the cylinder-head-sector (CHS) location and the logical block address (LBA) of a boot sector for each of the desired partitions. In operation 110, it is determined whether the computer readable medium, or disk, is associated with a controller card having an option-ROM with a BIOS. If there is an option ROM with a BIOS on the controller card, operation 112 includes populating each of the boot sectors with F6 values for all of the variables of the boot sector. Thus if in operation 110, on the other hand, a controller card with an option-ROM having a BIOS is not found, in operation 114 each of the boot sectors are populated with a non-F6 value for at least one of the variables of the boot sector. Exemplary variables of the boot sector for both a FAT-16 and FAT-32 are shown in FIG. 13 discussed below.

Once the rebooting in operation 95 is performed, the method will move to formatting 96. Initially, the partition(s) to be formatted are selected in 120. Upon selection, the method moves to operation 122 where a full boot sector data is written at the CHS or LBA location. In one embodiment, the standard Microsoft Windows formatting function is implemented. Once formatting is complete, the method will end.

Figure 1:
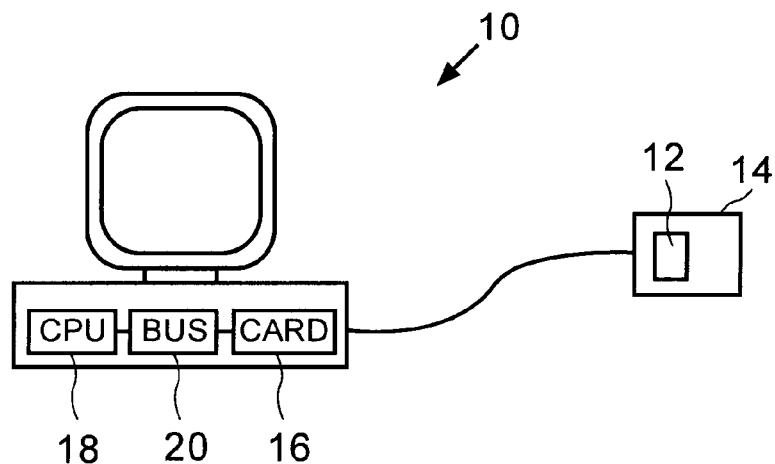
FIG. 1 is a schematic of a computer system with a peripheral media drive.
Figure 2A:
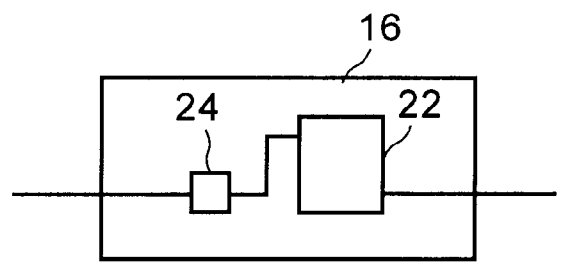
FIG. 2A is a schematic of a controller card of the computer system of FIG. 1.
Figure 2B:
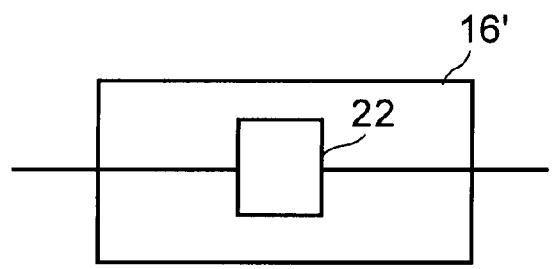
FIG. 2B is a schematic of an alternative controller card of the computer system of FIG. 1.
Figure 3:
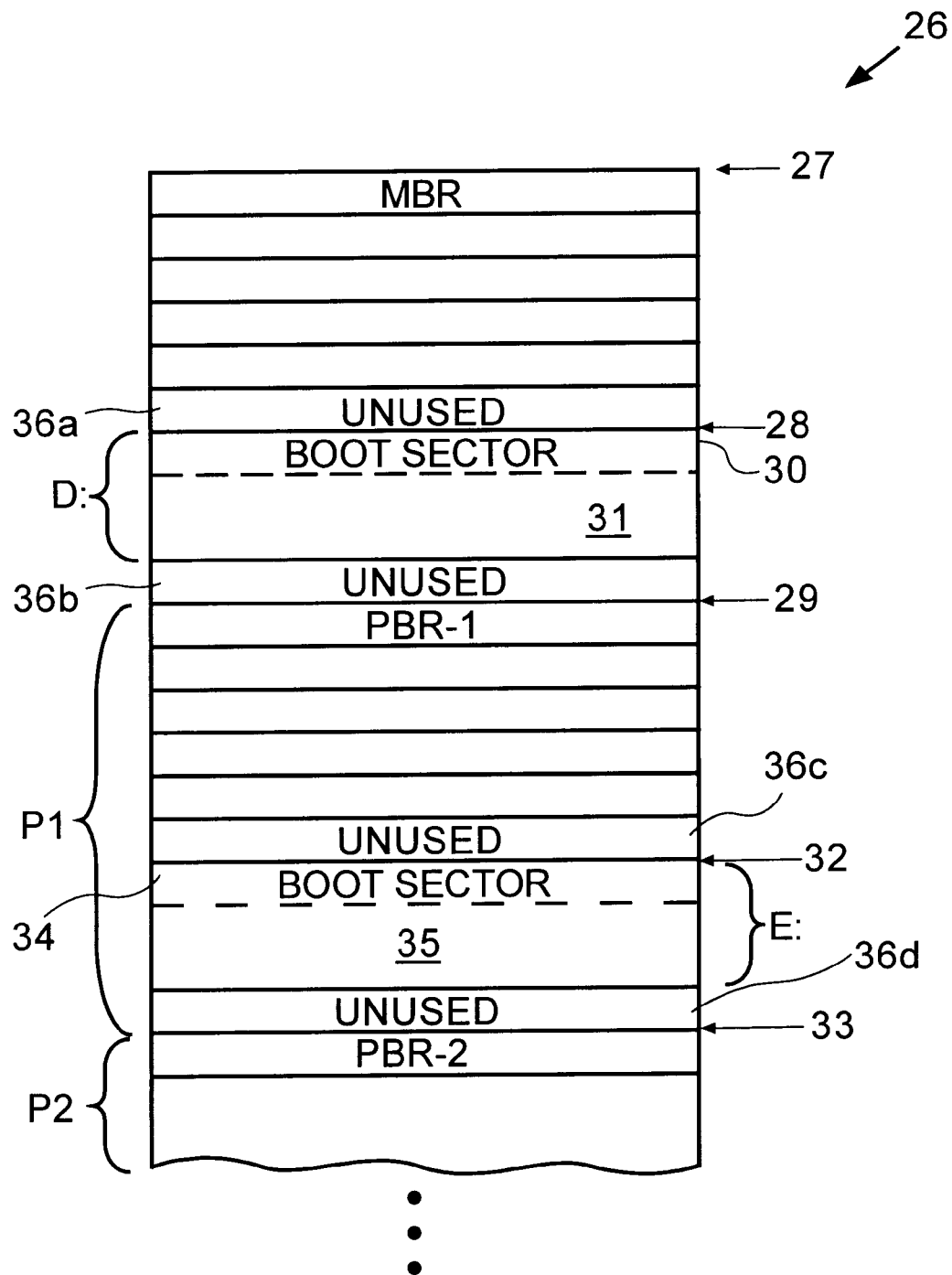
FIG. 3 is a schematic of data storage space of a medium and relative location of various partition data within the data storage space.
Figure 4:
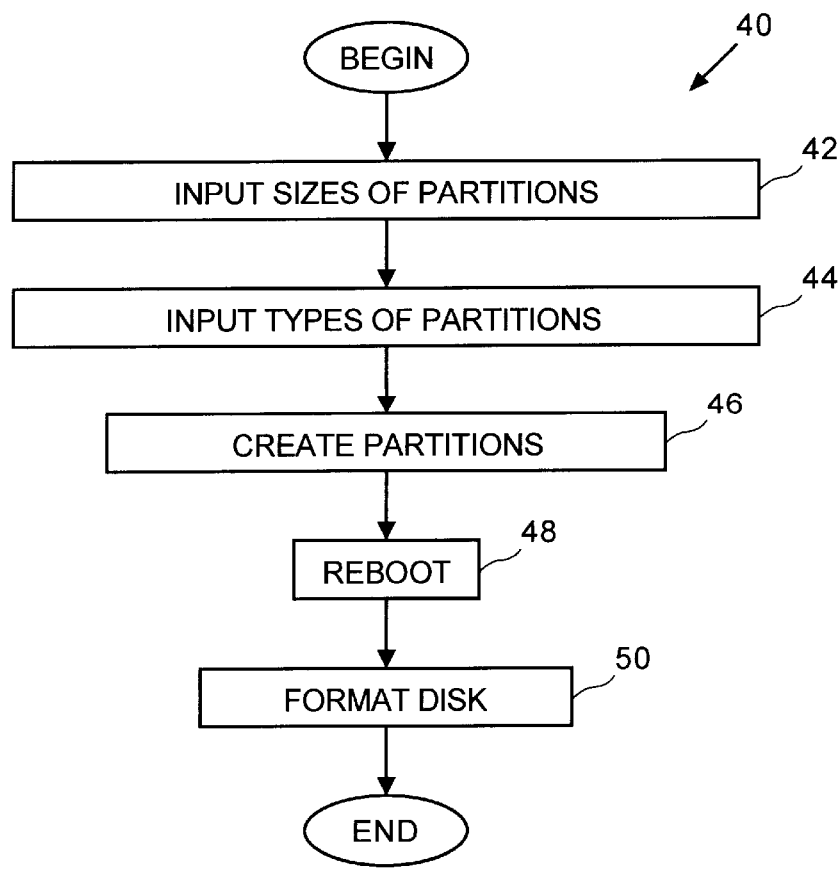
FIG. 4 is a process diagram of a method of the prior art for creating and partitioning a disk.
Figure 5:
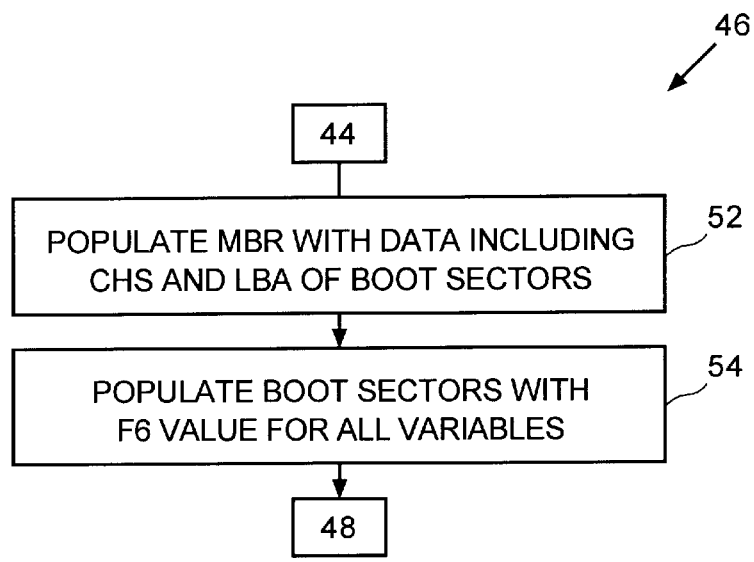
FIG. 5 is a process diagram of the partition creation operation of the method of FIG. 4.
Figure 6:
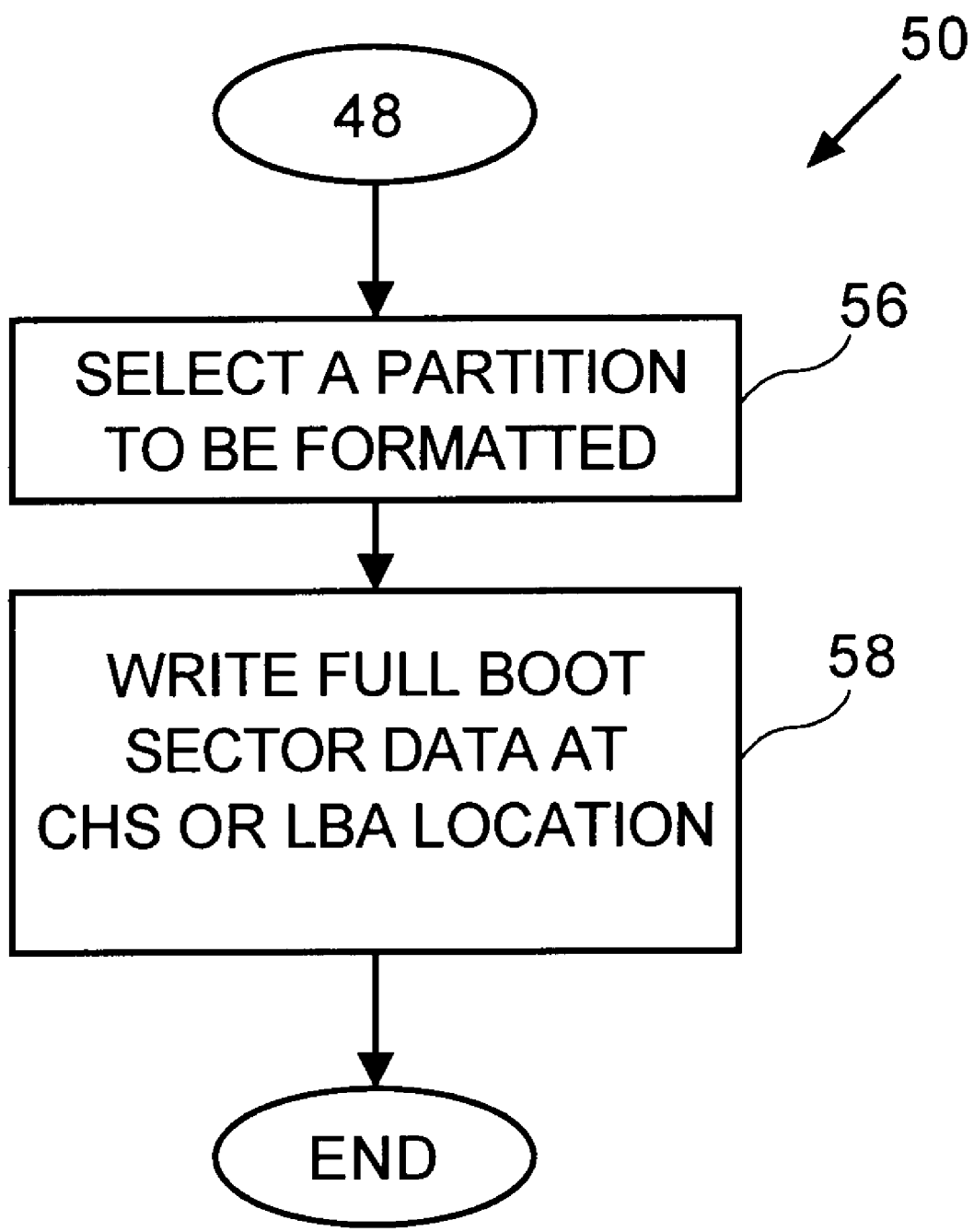
FIG. 6 is a process diagram of the disk format operation of the method of FIG. 4.
Figure 7:
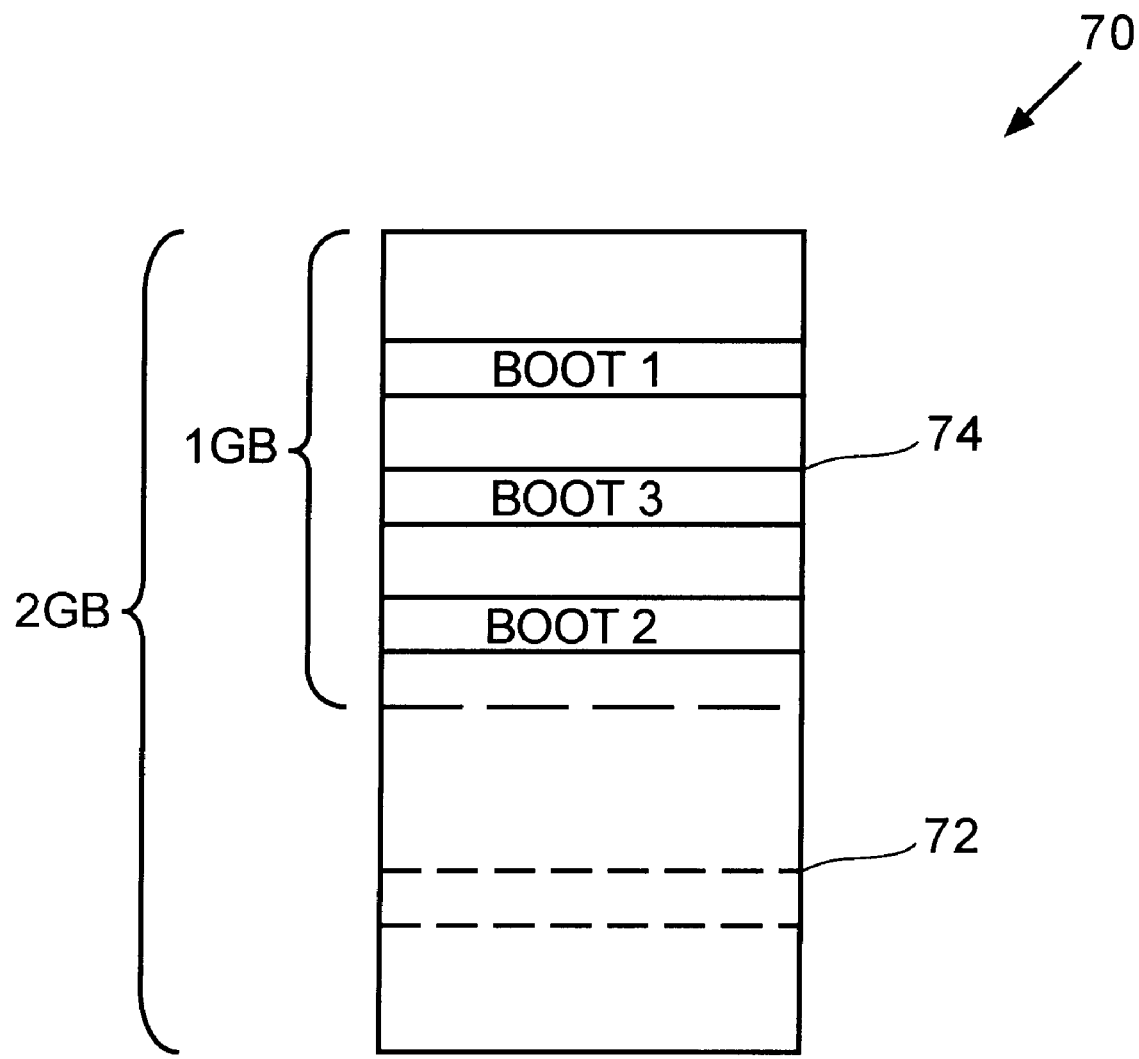
FIG. 7 is a schematic of a >1 GB data storage space of a disk with placement of a partition that is desired to be beyond the first gigabyte, according to the prior art.
Figure 11:
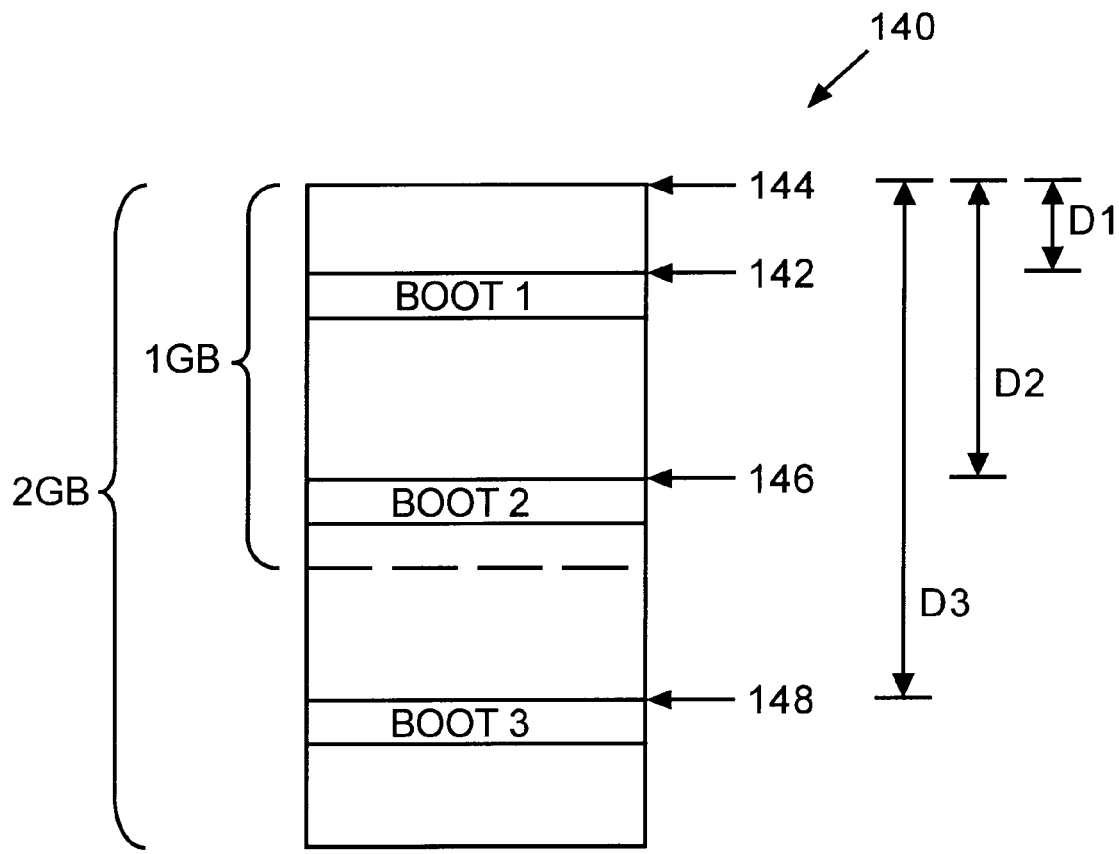
FIG. 11 is a schematic of a >1 GB data storage space with a partition correctly created and formatted beyond the first gigabyte, according to an embodiment of the present invention.

FIG. 11 is a schematic representation of the data storage space 140, of a portion of a computer readable medium or disk after manipulation in accordance with an embodiment of the present invention. In particular, the data storage space 140 is, in this example, two gigabytes (2 GB) in size. The first boot sector BOOT 1, associated with a first partition, is located at a first location 142 that is a first distance D1 away from the beginning of the data storage space 144, this particular distance being less than one gigabyte (i.e., <1 GB) from the beginning 144. Therefore, the first boot sector BOOT 1 is located within the first gigabyte of the data storage space 140. A second boot sector BOOT 2, associated with a second partition, is in a second location 146 that is a second distance D2 away from the beginning of the data storage space 144, this distance also being less than one gigabyte. Therefore, the second boot sector BOOT 2 is also within the first gigabyte of the data storage space 140. In this way, the locations of the first and a second boot sectors within the first gigabyte of the data storage space 140 are located similarly to the first and second boot sectors of the prior art shown in FIG. 7.

However, the third boot sector BOOT 3, associated with a third partition (or any additional partitions), is located at a third location 148 that is a third distance D3 away from the beginning of the data storage space 144, with this distance being greater than one gigabyte. Thus, the third boot sector BOOT 3 is located beyond the first gigabyte of the data storage space 140. Because the boot sector BOOT 3 is located in the desired location beyond the first gigabyte in the data storage space 140, data in the third partition can be properly stored and accessed without corruption of data in other partitions associated with other boot sectors, or vice versa.

FIG. 12 is a table of representative variables in the boot sector of each partition for both a FAT-16 and FAT-32 type partition. As shown, the FAT-16 type partition boot sector can include the variables bytes-per-sector, number of reserve sectors, number of FATs, media type, sectors-per-track, number of heads, hidden sectors, large sectors, physical disk number, volume label, and an end marker. In addition to these variables, a FAT-32 type partition also includes the variables Ext. BPB (Extended BIOS Parameter Block) Sig., and the FAT type.

While, as shown in FIG. 10, operation 114 of operation 106 can include the population of only one variable of the boot sector with a non-F6 value, more than one of the variables shown in FIG. 12 of the boot sector can also be populated with a non-F6 value. To further exemplify the result of operation 114 on the computer readable medium or disk, FIG. 13 shows a boot sector of a FAT-32 type partition after operation 114. In particular, as can be seen in FIG. 13, non-F6 values have been populated in the location of each of the boot sector variables listed in FIG. 12.

For example, a non-F6 value has been entered into the two-byte bytes-per-sector variable location 152. Likewise, non-F6 values have been entered into the two-byte reserve sectors variable location 154, the one-byte number of FATs variable location 156, the one-byte media type variable location 158, and the two-byte sectors-per-track variable location 160. Non-F6 values can also be populated into the two-byte number of heads variable location 162, the four-byte hidden sectors variable location 164, and the four-byte large sector variable location 166. In accordance with operation 114 of the present invention, any or all of the remaining variable locations can also be populated with a non-F6 value, such as the one-byte physical disk number or Ext. BPB Sig. variable locations 168 or 170, the eleven-byte volume label variable location 172, the eight-byte fat type variable location 174, or the two-byte end marker location 176. While FIG. 13 shows each of these variable locations including a non-F6 value, as noted above, the present invention can alternatively include the population of fewer of even a single variable with a non-F6 value.

The present invention may employ various computer-implemented operations involving data stored in computer systems to drive computer software, including application programs, operating system programs, peripheral device drivers, etc. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 14:
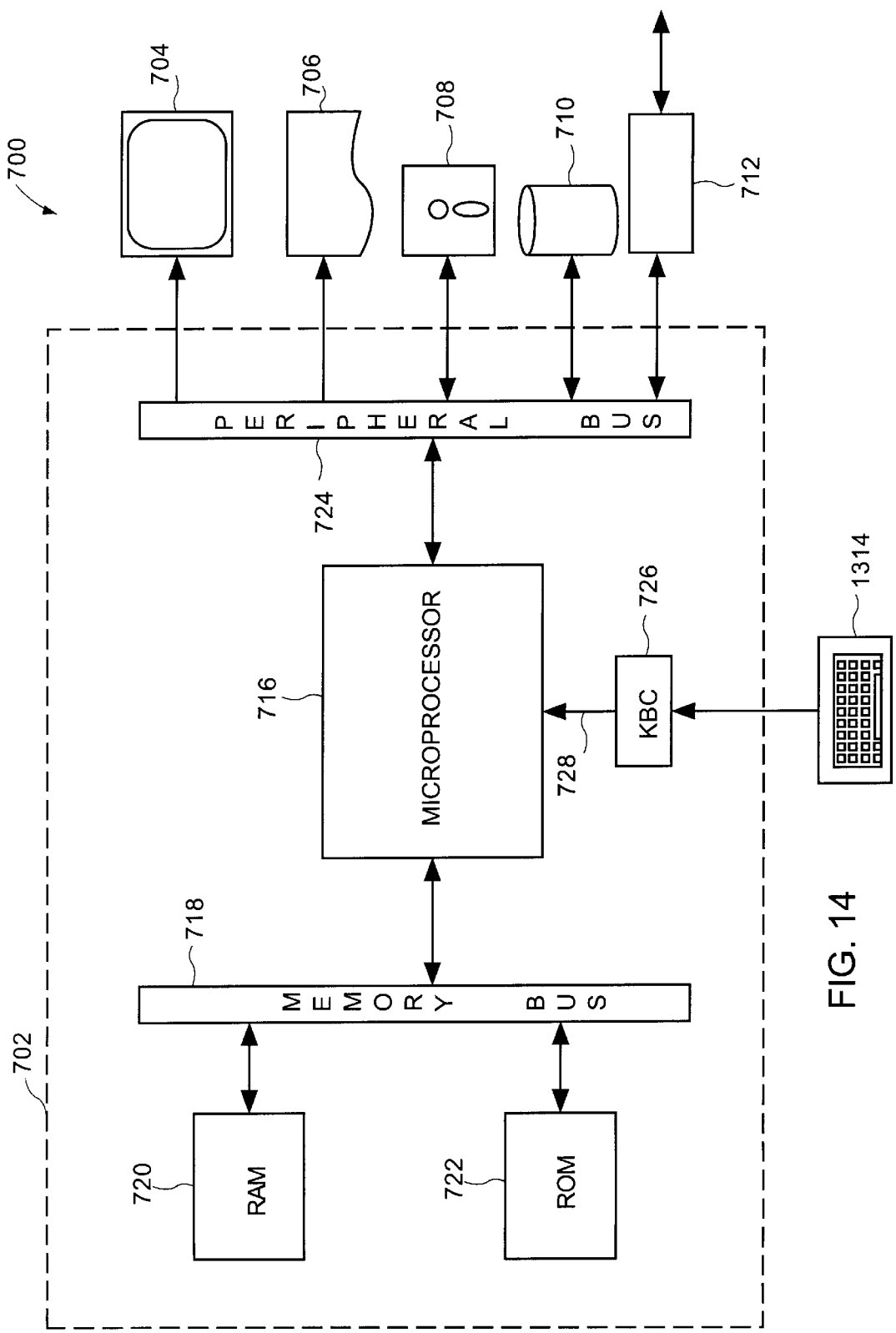
FIG. 14 is a schematic of a computer system for performing program instructions according to various embodiments of the present invention.

FIG. 14 is a block diagram of an exemplary computer system 700 for carrying out the processing according to the invention. The computer system 700 includes a digital computer 702, a display screen (or monitor) 704, a printer 706, a floppy disk drive 708, a hard disk drive 710, a network interface 712, and a keyboard 714. The digital computer 702 includes a microprocessor 716, a memory bus 718, random access memory (RAM) 720, read only memory (ROM) 722, a peripheral bus 724, and a keyboard controller (KBC) 726. The digital computer 702 can be a personal computer (such as an IBM-compatible personal computer, a Macintosh computer, or a Macintosh-compatible computer), a workstation computer (such as a Sun Microsystems or Hewlett-Packard workstation), or some other type of computer.

The microprocessor 716 is a general purpose digital processor which controls the operation of the computer system 700. The microprocessor 716 can be a single-chip processor or can be implemented with multiple components. Using instructions retrieved from memory, the microprocessor 716 controls the reception and manipulation of input data and the output and display of data on output devices. According to the invention, a particular function of microprocessor 716 is to assist in execution and rendering of the software operations of a media preparation tool and/or a script for creating and formatting partitions on a greater than 1 GB media associated with a controller card without an option-ROM that has a BIOS.

The memory bus 718 is used by the microprocessor 716 to access the RAM 720 and the ROM 722. The RAM 720 is used by the microprocessor 716 as a general storage area and as scratch-pad memory, and can also be used to store input data and processed data. The ROM 722 can be used to store instructions or program code followed by the microprocessor 716 as well as other data.

The peripheral bus 724 is used to access the input, output, and storage devices used by the digital computer 702. In the described embodiment, these devices include the display screen 704, the printer device 706, the floppy disk drive 708, the hard disk drive 710, and the network interface 712. The keyboard controller 726 is used to receive input from keyboard 714 and send decoded symbols for each pressed key to microprocessor 716 over bus 728.

The display screen 704 is an output device that displays images of data provided by the microprocessor 716 via the peripheral bus 724 or provided by other components in the computer system 700. The printer device 706, when operating as a printer, provides an image on a sheet of paper or a similar surface. Other output devices such as a plotter, typesetter, etc. can be used in place of, or in addition to, the printer device 706.

The floppy disk drive 708 and the hard disk drive 710 can be used to store various types of data. The floppy disk drive 708 facilitates transporting such data to other computer systems, and hard disk drive 710 permits fast access to large amounts of stored data.

The microprocessor 716 together with an operating system operate to execute computer code and produce and use data. The computer code and data may reside on the RAM 720, the ROM 722, or the hard disk drive 710. The computer code and data could also reside on a removable program medium and loaded or installed onto the computer system 700 when needed. Removable program media include, for example, CD-ROM, PC-CARD, floppy disk and magnetic tape.

The network interface 712 is used to send and receive data over a network connected to other computer systems. An interface card or similar device and appropriate software implemented by the microprocessor 716 can be used to connect the computer system 700 to an existing network and transfer data according to standard protocols.

The keyboard 714 is used by a user to input commands and other instructions to the computer system 700. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can thereafter be read by a computer system. Examples of the computer readable medium include read-only memory (ROM), random-access memory (RAM), CD-ROMs, magnetic tape, and optical data storage devices. The computer readable medium can also be distributed over a network that couples computer systems so that the computer readable code is stored and executed in a distributed fashion.

Accordingly, the present invention provides structures and methods for creating and formatting a partition beyond a first gigabyte of a disk that associated with a controller card without an option-ROM that has a BIOS. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A method for creating FAT partitions on a computer readable medium, comprising:
   running an operating system on a computer system that is connected to a computer readable medium, having greater than one gigabyte of data storage space and being associated with a controller card without a BIOS on an option ROM, wherein the operating system is configured to create a FAT partition within a first gigabyte of data storage space in a location that is included within at least one other partition;
   partitioning the computer readable medium with the FAT partition within a portion of the computer readable medium that is beyond the first gigabyte of data storage space; and
   formatting the computer readable medium, including the FAT partition within the portion of the computer readable medium that is beyond the first gigabyte of data storage space.

2. The method as recited in claim 1, wherein the operating system is one of a windows operating system and a DOS operating system.

3. The method as recited in claim 1, wherein partitioning the computer readable medium includes:
   inputting a desired quantity of desired FAT partitions, including the FAT partition to be created in the portion of the computer readable medium that is beyond the first gigabyte of data storage space;
   inputting a type to be associated with each of the desired FAT partitions;
   determining a size of each of the desired FAT partitions, wherein each size is equal;
   providing the user an opportunity to enter a modification of each size; and
   creating the desired FAT partitions on the computer readable medium, using the modification if entered.

4. The method as recited in claim 3, wherein creating the desired FAT partitions includes:
   populating the master boot record with data including the CHS location and LBA location of a boot sector that is associated with each of the desired FAT partitions, wherein each boot sector has a variable;
   determining whether the computer readable medium is associated with a controller card having an option ROM with a BIOS; and
   populating each boot sector with a value other than F6 for the variable of the boot sector.

5. The method as recited in claim 4, wherein formatting the computer readable medium includes:
   selecting a partition to be formatted;
   determining whether the computer readable medium is associated with a controller card that has an option ROM without a BIOS; and
   writing full boot sector data at the LBA location for the boot sector of the selected partition, if the computer readable medium is associated with a controller card that has an option ROM without a BIOS.

6. The method as recited in claim 5, further comprising determining whether the boot sector of the selected partition includes a value other than F6.

7. A method of creating FAT partitions on a computer readable medium that is connected to a computer system, comprising:
   booting an operating system associated with a computer system;
   inputting a desired quantity of FAT partitions;
   inputting a desired type to be associated with each of the FAT partitions;
   determining a size of each of the FAT partitions, wherein the size is equal for each of the FAT partitions;
   providing a user with opportunity to enter a modification of the size of at least one of the FAT partitions;
   creating the FAT partitions on a computer readable medium using the modification if entered;
   rebooting the operating system; and
   formatting the computer readable medium.

8. The method as recited in claim 7, wherein creating the FAT partitions includes:
   populating a master boot record, having a plurality of variables, with data including a CHS and a LBA associated with a boot sector of each of the FAT partitions;
   determining whether there is an option ROM with a BIOS on a control card that is associated with the computer readable medium; and
   populating each boot sector with a value other than F6 for at least one of the plurality of variables of the boot sector, if the control card does not have an option ROM with a BIOS.

9. The method as recited in claim 7, wherein formatting the computer readable medium includes:
   selecting a FAT partition to be formatted;
   determining whether there is an option ROM with a BIOS on a control card that is associated with the computer readable medium; and writing an entire set of boot sector data at the LBA location provided in the master boot record, and associated with the boot sector of the selected FAT partition.

10. The method as recited in claim 7, wherein inputting the desired quantity of FAT partitions includes prompting the user to enter the desired quantity.

11. The method as recited in claim 7, wherein inputting the desired type includes prompting the user to enter the desired quantity.

12. The method as recited in claim 7, wherein providing the user with the opportunity to enter a modification of the size of at least one of the FAT partitions includes displaying a graphical depiction of the size of each FAT partition the sizes of which can be graphically modified by the user through the use of a user input device that is connected to the computer system.

13. A computer readable medium containing program instructions for creating formatted FAT partitions on a separate computer readable medium, having greater than one gigabyte of data storage space and being associated with a controller card without a BIOS on an option ROM, in conjunction with an operating system that is configured to create a FAT partition within a first gigabyte of the data storage space in a location that is included within at least one other partition, the computer readable media comprising:

program instructions for partitioning the separate computer readable medium, with the FAT partition within a portion of the computer readable medium that is beyond the first gigabyte of data storage space; and program instructions for formatting the separate computer readable medium, including the FAT partition within the portion of the computer readable medium that is beyond the first gigabyte of data storage space.

14. The computer readable medium as recited in claim 13, wherein the program instructions for partitioning include:

program instructions for inputting a desired quantity of desired FAT partitions, including the FAT partition to be created in the portion of the computer readable medium that is beyond the first gigabyte of data storage space;

program instructions for inputting a type to be associated with each of the desired FAT partitions;

program instructions for determining a size of each of the desired FAT partitions, wherein each size is equal;

program instructions for providing the user an opportunity to enter a modification of each size; and program instructions for creating the desired FAT partitions on the computer readable medium, using the modification if entered.

15. The computer readable medium is recited in claim 14, wherein the program instructions for creating the desired FAT partitions include:

program instructions for populating the master boot record with data including the CHS location and LBA location of a boot sector that is associated with each of the desired FAT partitions, wherein each boot sector has a variable;

program instructions for determining whether the computer readable medium is associated with a controller card having an option ROM with a BIOS; and program instructions for populating each boot sector with a value other than F6 for the variable of the boot sector.

16. The computer readable medium as recited in claim 15, wherein the program instructions for formatting the computer readable medium include:

program instructions for selecting a partition to be formatted;

program instructions for determining whether the computer readable medium is associated with a controller card that has an option ROM without a BIOS; and program instructions for writing full boot sector data at the LBA location for the boot sector of the selected partition, if the computer readable medium is associated with a controller card that has an option ROM without a BIOS.

17. The computer readable medium as recited in claim 16, wherein the program instructions for formatting the computer readable medium further include program instructions for determining whether the boot sector of the selected partition includes a value other than F6.

18. The computer readable medium as recited in claim 15, wherein the program instructions for formatting the computer readable medium include:

program instructions for selecting a partition to be formatted;

program instructions for determining whether the computer readable medium is associated with a controller card that has an option ROM without a BIOS;

program instructions for determining whether the boot sector of the selected partition includes a value other than F6; and program instructions for writing full boot sector data at the LBA location for the boot sector of the selected partition, if the computer readable medium is associated with a controller card that has an option ROM without a BIOS and if the boot sector of the selected partition includes a value other than F6.

* * * * *